Nov. 29, 1949     L. S. WASSERMAN ET AL     2,489,343
VIBRATION ABSORBER DEVICE FOR HELICOPTERS
Filed Aug. 29, 1945
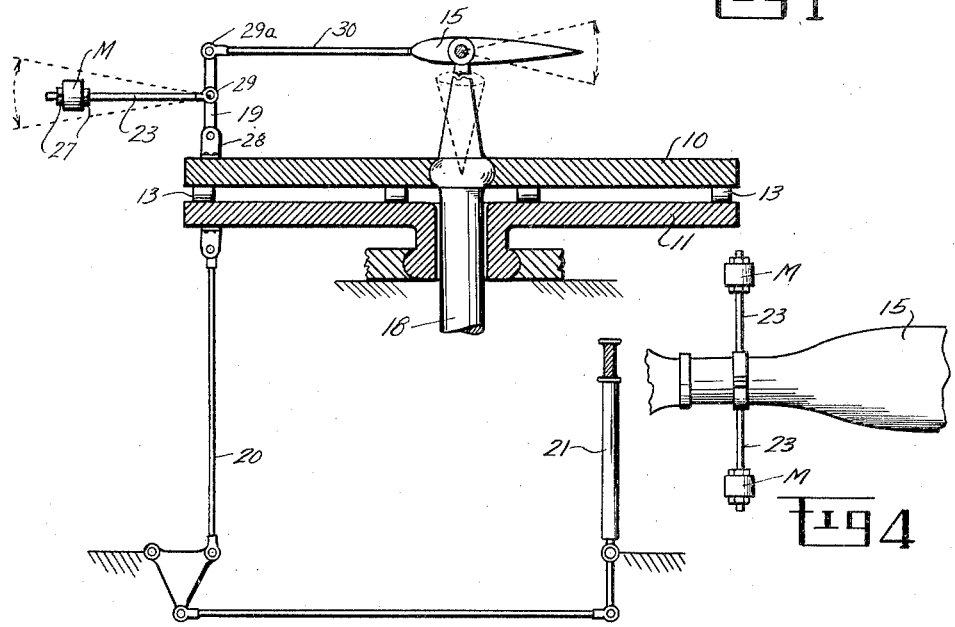
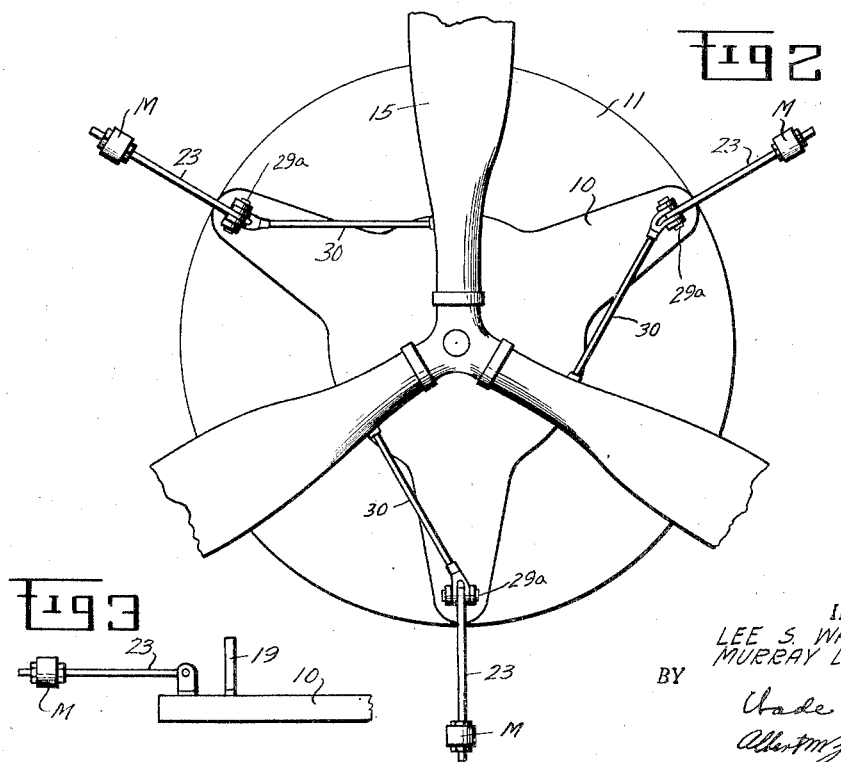
INVENTORS
LEE S. WASSERMAN
MURRAY L. DEUTSCH
BY
*ATTORNEYS*

Patented Nov. 29, 1949

2,489,343

UNITED STATES PATENT OFFICE 2,489,343

VIBRATION ABSORBER DEVICE FOR HELICOPTERS

Lee S. Wasserman and Murray L. Deutsch, Dayton, Ohio

Application August 29, 1945, Serial No. 613,412

1 Claim. (Cl. 170—160.25)

(Granted under the act of March 3, 1883, as amended April 30, 1928; 370 O. G. 757)

The invention described herein may be manufactured and used by or for the Government for governmental purposes without the payment to us of any royalty thereon.

This invention relates to vibration absorbing devices and more particularly to a vibration absorbing device for use in a helicopter for preventing transmission of vibration from the blades to the azimuth control stick.

One of the problems existing in connection with the operation of helicopters is the vibration caused by aerodynamic blade pitching moments transmitted to the mechanical linkage system connected to the azimuth control stick which causes considerable vibration of that member, making manual operation thereof difficult and fatiguing, and its is an object of our invention to eliminate this vibratory condition.

Our invention consists in disposing pendulously supported masses in combination with the vibratory elements, i. e., the blades, the azimuth plate and the push-pull rods of a helicopter, in such a manner that vibration is substantially eliminated from these members by opposing forces effected by oscillation of the pendulous masses in response to vibration of such members. By providing masses having an oscillatory frequency which bears a certain relationship to the number of blades on the rotor and the rate of rotation thereof and by symmetrically distributing the masses with respect to the rotor, we have found it possible to substantially eliminate vibrations from the azimuth control stick of a predetermined order.

We are aware that the use of pendulously suspended vibrating masses for overcoming vibrations in shafts and other machine elements is not new. For example, one such application is disclosed in the patent to Sarazin No. 2,137,591. However, in the present case there is disclosed a unique relation in the frequency of the pendulously suspended mass with respect to the number of blades of the rotor and the rate of rotation thereof which produces a hitherto unknown result and which is believed to be novel.

We have found that the non-rotating elements of a conventional helicopter control system have a vibration frequency equal to the product of the R. P. M. multiplied by the number of blades, and it is chiefly this frequency which is transmitted to the azimuth control stick, being in fact manifested by a wobble-like vibration of the azimuth plate as will be hereinafter described. The rotating elements of the system, however, have a vibration frequency equal to the product of the R. P. M. multiplied by (N—1) where N equals the number of blades on the rotor. Accordingly, by removing vibrations of the latter frequency from the rotating system, we have eliminated vibration in the non-rotating system including those vibrations in the azimuth control stick which are the most troublesome.

The nature of our invention will now be disclosed with reference to the appended drawings, in which Fig. 1 is illustrative of a vertical section through a helicopter rotor axis and shows one arrangement of our invention with a conventional helicopter system;

Fig. 2 is a plan view of the arrangement shown in Fig. 1;

Fig. 3 shows another mode of arranging our invention with a conventional helicopter system;

Fig. 4 shows still another mode of arranging our invention with a conventional helicopter system.

With reference to Figs. 1 and 2, upper and lower azimuth plate elements 10 and 11, respectively, of a three-bladed rotor are shown having a number of rollers 13 therebetween. For each rotor blade 15 supported on a main shaft 18, a push-pull rod 19 is pivotally supported to plate 10 and coacts with the respective blade in a well-known manner for cyclically twisting the blade to effect a pitch angle. The plate 10 has universal motion with respect to shaft 18 and plate 11 has a universal motion with respect to the aircraft. A control system 20 leading to an azimuth control stick 21 for adjustably varying the tilt of plate 11 is provided as shown. The arrangement thus far described is conventional and further details are not necessary or material to the present invention.

Vibration enters the system by reason of twisting of blades 15 effected by aerodynamic forces as indicated on Fig. 1, which results in vibrations in the several rods 19, which vibrations cause the plate elements to wobble in a manner whereby the axis thereof generates a conic shape as indicated in an exaggerated manner by the dot-dash cone in Fig. 1. This wobbling vibration is transmitted through the system 20 to the stick 21 and causes a similar wobbling vibration therein of a frequency, as we have found, equal numerically to the number of rotor blades multiplied by the R. P. M. of the rotor.

Our invention consists in providing a mass M pivotally secured by means of a link 23 to each push-pull rod 19 so as to be constrained to pivotal motion in a plane parallel to the axis of the rotor, or containing that axis, there being any suitable means of adjusting each mass M with respect to its distance from the respective push-pull rod, such as by nuts 27 engaging threads provided on each rod 23. Each rod 19 is pivotally attached to a fulcrum 28 and each link 23 is pivoted to each rod 19 substantially at the middle point 29 thereof. The top of each rod 19 is connected by a pivot 29a to a rod 30 which connects that pivot with one propeller blade 15 near the shank thereof. When the blades 15 are rotating the several masses M are normally supported in a radial plane by centrifugal force. Since, however, the masses M are pivoted to rod 19 in such a manner that they can oscillate only in planes parallel to the rotor axis, or containing the rotor axis, as indicated by the dashed lines on Fig. 1, any longitudinal vibration in rods 19, such as is effected by vibration of the respective blades, will cause an oscillation of the respective masses M. If the masses M be fixed on rods 23 at such distance that their natural frequency of oscillation is equal to the frequency of longitudinal vibration of their rods, the oscillatory motion of the masses will be of maximum amplitude and 180° out of phase with the vibration of their respective rods and accordingly will have the effect of opposing the longitudinal vibrations therein. Thus, the vibrations of the rods in the direction of their lengths will be substantially eliminated at least as to the particular frequency to which the respective pendulum systems are resonant. The oscillatory frequency of each mass M is predetermined so as to be equal numerically to the product of the R. P. M. multiplied by an integer equal to one less than the number of blades in the rotor, this being, as we have found, the frequency of the longitudinal vibrations of the several rods 19 which forms a part of the rotating system. Accordingly, the azimuth plate will no longer have the vibrational wobble illustrated in Fig. 1, from which it follows that vibration throughout the system 20 and stick 21 is likewise eliminated.

Proper values of the masses may be determined by calculation or experiment, as may also be their pendulous distance from the point of attachment to the rotating system. The natural frequency, however, of pendulous oscillation, in order to obtain the vibration absorbing effect taught herein, must conform to the product of the $$R. P. M. \times (N-1)$$

as heretofore explained. The fundamental relationship holds for a rotor of any given number of blades.

We have found our invention capable of use in combination with helicopter elements in a way other than that exemplified in the specific embodiment herein, e. g., the oscillating masses are effective when pivoted directly to the rotating element of the azimuth plate, i. e., the plate 10 herein, as shown in Fig. 3, at points radially aligned with respective push-pull rods. Also, a pair of masses could, if desired, be individually pivotally attached directly to respective blades and arranged to oscillate in planes perpendicular to the respective axes thereof, as shown in Fig. 4. However, such changes are regarded as a mere matter of choice and within the spirit of our invention and we seek patent protection within the scope of the claim appended hereto.

We claim:

In combination, a tiltable azimuth plate for a helicopter, a helicopter rotor having a plurality of blades, said azimuth plate being tiltable with respect to said rotor, a drive shaft extending through said azimuth plate to drive said rotor, a number of fulcra equal to the number of rotor blades, said fulcra being attached to said azimuth plate radially midway between said blades, a first set of rods, pivots connecting said rods to the blades of said rotor substantially at the shanks thereof, a second set of rods each being pivoted from each of the said fulcra, pivots connecting the first and second sets of rods, a link pivoted from each of the second set of rods to swing toward and away from the plane of rotation of said azimuth plate and of said rotor, a mass of predetermined weight adjustably attached on each of said links so that its distance from the point of link attachment can be regulated, the effect of the rod linkage being that a change in the pitch of the rotor blade will transmit an impulse via the first set of rods to vary the inclination of the second set of rods to vary the natural frequency of vibration of the links and their associated masses whereby to substantially eliminate lengthwise vibrations in the rod systems at the frequency to which said systems are resonant, and tilting means for said azimuth plate which comprises a control stick and link means controlled thereby for transmitting a push or a pull to the outer and under side of said azimuth plate.

LEE S. WASSERMAN.
MURRAY L. DEUTSCH.

REFERENCES CITED

The following references are of record in the file of this patent:

UNITED STATES PATENTS

| Number | Name | Date |
| --- | --- | --- |
| 1,638,782 | Paton | Aug. 9, 1927 |
| 2,038,603 | Roche | Apr. 28, 1936 |
| 2,050,142 | White | Aug. 4, 1936 |
| 2,076,090 | Myers | Apr. 6, 1937 |
| 2,100,833 | Bruckel et al. | Nov. 30, 1937 |
| 2,225,929 | Sarazin | Dec. 24, 1940 |